Figure 1:
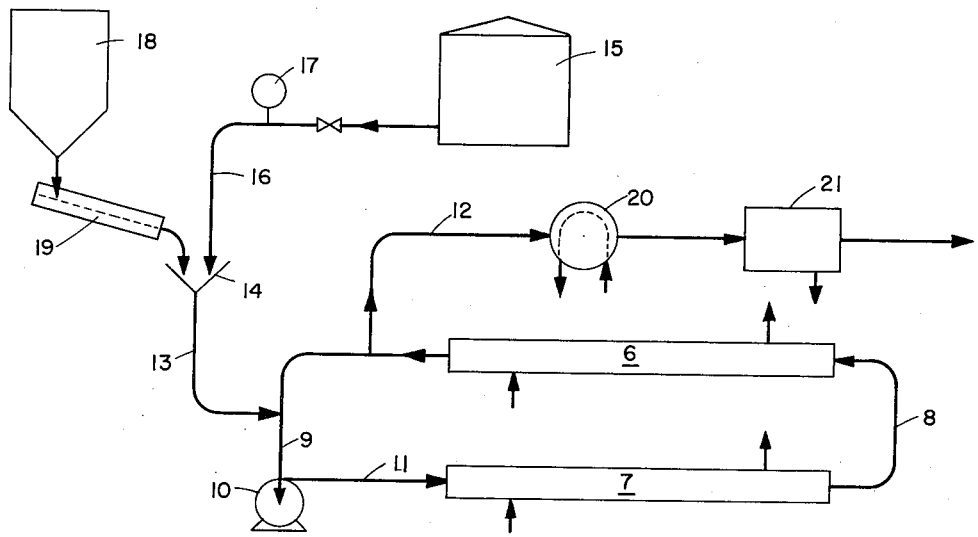
Figure 2:
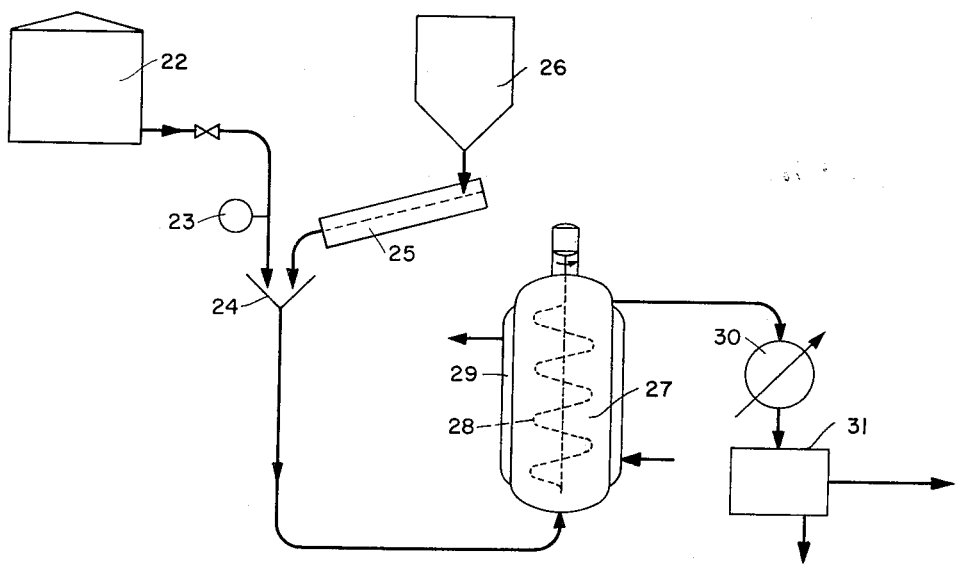
Figure 3:
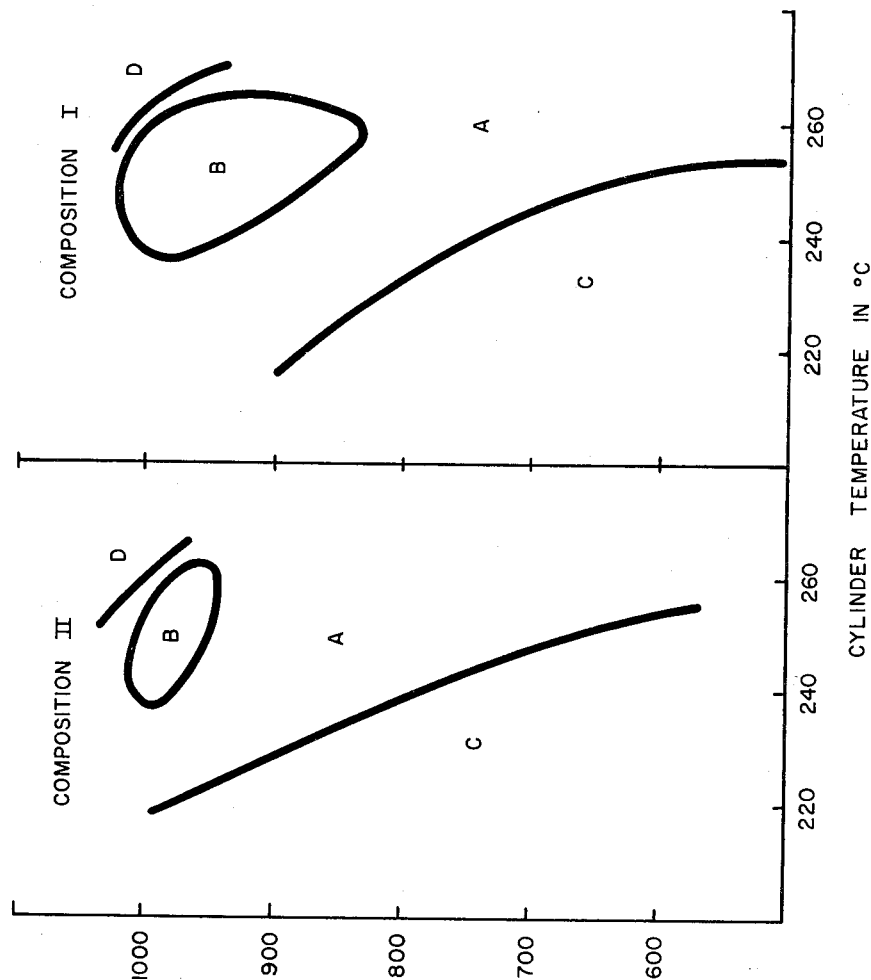

Sept. 4, 1962     W. J. CLELAND ET AL     3,052,664

POLYMERIZATION OF VINYL AROMATIC COMPOUNDS

Filed April 30, 1959     4 Sheets-Sheet 1

INVENTORS:
WILLIAM J. CLELAND
HAROLD G. HENSHALL
ALEC N. ROPER
JESSE M. WARING
ERNEST SEIJO

BY: *James H. Parker.*
THEIR ATTORNEY

United States Patent Office 3,052,664
Patented Sept. 4, 1962

3,052,664
POLYMERIZATION OF VINYL AROMATIC COMPOUNDS
William J. Cleland, Flixton, Harold G. Henshall, Styal, Wilmslow, Alec N. Roper, Eccles, Jesse M. Waring, Flixton, and Ernest Seijo, Sale, England, assignors to Shell Oil Company, a corporation of Delaware
Filed Apr. 30, 1959, Ser. No. 810,000
Claims priority, application Great Britain Apr. 30, 1958
8 Claims. (Cl. 260—93.5)

The present invention relates to a method of preparing polyvinyl aromatic compounds having good flow properties, and particularly to the preparation of easily moldable polystyrene.

One of the main uses of polyvinyl-aromatic compounds such as polystyrene is in the production of plastic moldings. It is well known that the flow properties of polystyrene are particularly important to the injection molding manufacturer. Flow properties can be improved by plasticizing the polystyrene by adding to the polystyrene a low molecular weight liquid polystyrene, a hydrocarbon oil or a non-volatile ester which acts as internal lubricants during the molding operation. However, the use of such additives is not without disadvantages, as for example a tendency to impair the setting properties of the polystyrene, thus giving rise to the need for longer molding cycles. The use of such additives also gives rise to the danger of "sink marks" caused by a reverse flow out of the mold when the injection pressure is released.

The addition of a minor proportion, for example 5–15% by weight of low molecular weight solid polystyrene to the high molecular weight polystyrene usually used for molding applications has now been found to improve the flow properties to much the same extent as the liquid flow molecular weight polymer, but without impairing its setting properties. However, it has been found difficult to blend the solid low molecular weight polystyrene with the high molecular weight polystyrene by a physical blending process, since the two different molecular weight materials are of such different physical characteristics that it is difficult to get a homogeneous blend. This blending is particularly difficult when the molecular weight of the high molecular weight polystyrene is high because the differences in physical characteristics become even more marked.

It has now been found that the desired homogeneous mixture of high and low molecular weight polystyrene may be obtained by adding the low molecular weight polystyrene prior to the polymerization which provides the desired high molecular weight component. In this way it is possible to obtain mixtures in which the molecular weight of the high molecular weight component is rather high and even above 100,000 without the above-mentioned difficulties.

Thus it is the primary object of this invention to provide an improved process for preparing polystyrenes in which components of widely divergent average molecular weights are present in a homogeneous mixture. Another object of this invention is to provide an improved process for preparing low molecular weight polymers for use as the low molecular weight component of the above-mentioned polystyrene compositions.

The invention is further illustrated in the following drawings which form a part of this specification:

FIGURE I is a flow diagram of a preferred system for providing the low molecular weight of polyvinyl aromatic component in accordance with the present invention.

FIGURE II is a diagram of a plan which may be used in an alternative method for preparing the low molecular weight component of the polyvinyl aromatic compound prepared according to this invention, and FIGURES III, IV and V are diagrams which represent the molding characteristics of polystyrene prepared according to the present invention and a polystyrene prepared by conventional commercial methods.

The desired polyvinyl aromatic compositions which are prepared according to the present invention contain from about 75 to about 95% of a high molecular weight polymer and from about 5 to about 25% of a low molecular weight polymer.

The present invention is applicable to the production of polyvinyl aromatic materials in general and the term is meant to cover polymers prepared from aromatics compounds containing a vinyl group in the molecule which is attached to the aromatic ring structure. Preferably, the material will be polystyrene and in its preferred form the invention relates to the production of polystyrene having desirable molding characteristics because polystyrene is the most useful polyvinyl aromatic compound in the plastic molding art. However, the invention also embraces substituted styrenes such as alpha methyl styrene, and nuclearly substituted styrenes such as vinyl toluene, 2-chloro styrene, 4-chloro styrene, 2,4-dichloro styrene, 2,5-dichlorostyrene and 2,4-dimethyl styrene. The hydrocarbon styrenes are preferable to the halogen substituted styrenes mentioned above.

The term low molecular weight polymer, as used herein, refers to a polyvinyl aromatic compound having an average molecular weight below 5,000. Preferably the average molecular weight of the low molecular weight component will be below 2,500 or even below 2,000. In general, the low molecular weight should be at least 1500 because of the danger of "sink marks" mentioned above.

The term high molecular weight polymer as used herein refers to polyvinyl aromatic compounds having an average molecular weight above about 60,000, and preferably above 80,000. The molecular weights referred to herein are "viscosity average molecular weights" and are determined from intrinsic viscosity measurements.

In accordance with the present invention, there is provided a process for preparing a polyvinyl-aromatic substance containing from about 75 to about 95% of a high molecular weight polymer and from about 5 to about 25% of a low molecular weight polymer, which comprises polymerizing a solution containing from about 75 to about 95% of a vinyl-aromatic compound and from about 4 to about 25% of a polyvinyl-aromatic compound having an average molecular weight or less than 5,000 by a free radical polymerization.

The present invention also provides an improved method for preparing low molecular weight polymers suitable for the low molecular weight component of the present invention. In one form, the process provides for the production of the low molecular weight component together with monomer in the desired proportions such that no additional monomer need be added after the process steps which provide the low molecular weight component. After the low molecular weight material is made, it is cooled, separated from catalysts and the polymerization completely stopped. If the proportions of monomer and polymer are within required ranges, the solution is then ready for polymerization to produce the high molecular weight component. If the proportions are too high in low molecular weight component, additional monomer is simply added until the desired proportions are reached. When the solution containing the low molecular weight polymer and monomer in the desired proportions is polymerized according to a free radical polymerization, there is substantially no further polymerization of the low molecular weight polymer while the monomer units polymerize to give the desired high molecular weight component. It has been found, quite unexpectedly, that the low molecular weight component not only does not polymerize further but also does not interfere with the free radical polymerization of monomer and extremely high molecular weight components are easily produced. Thus high molecular weight components may be provided which have a molecular weight of above 60,000 and even above 100,000. This high polymer is also homogeneously distributed with the low molecular weight polymer.

According to a preferred form of the present invention a continuous process for preparing a solution of a polyvinyl-aromatic compound having an average molecular weight below 5000 in the monomeric vinyl-aromatic compound, comprises mixing monomeric vinyl-aromatic compound with a catalyst capable of catalyzing a cationic polymerization, continuously feeding the resulting mixture to an elongated reaction zone in the form of a closed circuit in which the reaction mixture is continuously and rapidly circulated, maintaining the temperature of the reaction mixture circulating therein at between about 50° C. and 110° C., continuously withdrawing reaction mixture therefrom, cooling the withdrawn mixture to below about 30° C., and separating the catalyst from the cooled mixture.

Only a part of the monomer is polymerized so that the withdrawn reaction mixture, after separation of the catalyst, is for example a 5 to 60% and preferably a 30 to 40% (by weight) solution of low molecular weight polyvinyl-aromatic compound in the monomeric vinyl-aromatic compound.

The catalyst used in this continuous process can be any catalyst capable of inducing cationic polymerization. Examples of cationic catalysts include anhydrous aluminum chloride, stannic chloride, boron trifluoride, complexes, such as ether complexes of boron trifluoride, strong acids such as sulphuric acid and the halogen halides, activated clays and cation exchange resins. Preferably in carrying out the present invention a catalyst of the activated earth or clay type is used. Examples of this preferred catalyst includes Florida earth, bentonite, montmorillonite and hydrosilicates generally which have been activated by an acid treatment. For example fuller's earth which has been acid-treated, preferably with sulphuric acid, and thereafter dried e.g., by heating to above 200° C. is particularly suitable as a catalyst for the citionic polymerization required for the preparation of the low molecular weight polymer.

In general the amount of clay catalyst required is between 0.1 and 5% and usually between 0.5 and 1.5% by weight of the monomeric starting materials, depending on the actual degree of activity of the catalyst and the monomer employed. If necessary the amount of catalyst supplied the continuous process can also be varied from time to time so as to maintain a constant reaction rate during the run. The reaction temperature in the case of such a clay-catalyzed polymerization is preferably 60 to 80° C.

The present invention is applicable to the production of polyvinyl-aromatic compounds in general which have the above described molecular weight characteristics (i.e. 5 to 25% by weight of the polymer having an average molecular weight below 5000), that is to say polymers prepared from aromatic compounds, in particular hydrocarbons, containing a vinyl group ($CH_2=CH-$) in the molecule, such for example as styrene and substituted styrenes such as alpha-methyl styrene, and nuclearly-substituted styrenes such for example as vinyl toluene, 2-chlorostyrene, 4-chlorostyrene, 2,4-dichlorostyrene, 2,5-dichlorostyrene and 2,4-dimethylstyrene. However, it is particularly useful for the production of polystyrene having desirable molding characteristics and since polystyrene is the most useful polyvinyl-aromatic compound in the plastic molding art, the present invention will be described hereinafter with particular reference thereto.

It is also possible to obtain higher conversions in the continuous cationic polymerization by using an aromatic liquid diluent which is subsequently removed by distillation.

As mentioned above, the product of the low molecular weight polymerization described above will contain from 5 to 60% polymer and from 60-95% monomer. This solution is cooled to a temperature below 30° C. and is freed from catalyst by filtration, decantation, centrifugation or any other of the known methods for separating solids from liquids. It has been found that the monomer in this solution may be polymerized by a free radical polymerization reaction without interference by the low molecular weight polymer. Thus if the solution contains the desired proportions of monomer and polymer (from 5 to 25% polymer) it may be subjected to a free radical polymerization without further treatment. However, as the amount of polymer is greater than the desired percentage in final product, additional monomer is added in order to bring the proportions to a desired value within the ranges set forth in this application.

In general, any type of free radical polymerization may be used in order to polymerize the remaining monomer to the desired high molecular weight in the final polymer mixture. Thus the process may be a bulk, suspension or emulsion polymerization process and the reaction may be catalyzed by the use of the higher temperatures, peroxide catalysts, ionizing radiation, or any other of the known methods for providing a free radical polymerization. Examples of suitable free radical polymerization processes are described in British Patents 710,498, 707,-647, 707,548 and 659,771.

As mentioned above, any free radical polymerization process is considered suitable. However, we prefer to use the pearl polymerization process such as that described in British Patent 659,771. In accordance with such a process, the monomeric vinyl aromatic compound containing from 5 to 25% polymer is mixed with a small amount of peroxide such as benzoyl peroxide and stirred with its volume of water until the vinyl aromatic material is dispersed in the water. A dispersing agent such as calcium phosphate is added and the mixture is heated to a temperature of about 90° C. for about 12 hours with agitation or for a time sufficient to convert substantially all of the monomer to high molecular weight polymer. An illustration of a typical method for producing polystyrene in accordance with the present invention will be described with reference to FIGURES I and II of the drawing. In the embodiment shown in FIGURE I, the polymerization zone is provided by a reactor in the form of a closed circuit comprising a heater 6 and a cooler 7 connected together by pipes 8, 9, a circulating pump 10 and pipe 11. Pipe 9 is provided with a product draw-off line 12 and an input line 13 from a mixing funnel 14 to which styrene monomer is continuously supplied from a storage tank 15 via a valved line 16 and a flow meter 17. Catalyst comprising an activated fuller's earth or other clay is also supplied continuously to the funnel 14 from a hopper 18 by means of a vibratable chute 19 which acts as a metering device, the catalyst flow rate depending on the degree of vibratory movement imparted to the chute. The catalyst is thereby intimately mixed with the styrene monomer and the resulting mixture (or suspension) supplied continuously to the reactor.

In operation a reaction mixture comprises styrene monomer containing some low molecular weight polymer in solution and the catalyst in suspension is circulated rapidly around the closed circuit so as to maintain, by suitable adjustment of the heat supplied to and withdrawn from the system by means of heater 6 and cooler 7, a substantially constant reaction temperature. The velocity of the circulating liquid is also such that the catalyst is maintained in the form of a dispersion therein. Reaction mixture is continuously withdrawn through the line 12 and through a cooler 20, and if desired via a settling tank (not shown), to a filter 21 in which catalyst is removed leaving a solution of low molecular weight polystyrene in styrene monomer suitable for further polymerization by a free-radical bulk, suspension or emulsion polymerization process.

In a typical run using a polymerization plant having a total capacity of 1.2 liters the reaction conditions were as follows:

| | |
|---|---|
| Rate of styrene monomer input | 9 liters/hour. |
| Rate of clay catalyst input | 45 grams/hour. |
| Reaction temperature | 60° C. |
| Rate of liquid circulating in system | 3 gallons per minute. |
| Residence time in reactor | 8 minutes. |
| Percent low molecular weight polymer in the product | 28%. |

The clay catalyst used was an activated fuller's earth known as Fulmont 711C. Other grades of highly active, mineral acid activated, montmorillonite clays manufactured by the Fullers' Earth Union Limited which are also suitable are known as Fulmont 700C and Fulmont 800C.

An alternative way of producing the low molecular weight polystyrene is illustrated diagramamtically in FIGURE II of the accompanying drawings. In this method it is rather less easy to control the rate of reaction which tends to get out of control unless adequate removal of reaction heat is possible, and, for this reason, the continuous process described with reference to FIGURE I is preferred.

Referring to FIGURE II, styrene monomer is supplied continuously under gravity from a storage tank 22 through a flow meter 23 into a mixing funnel 24 in which activated clay is added continuously at a fixed rate via a vibratable chute 25 acting as a metering device from a hopper 26. The styrene monomer mixes with the clay and the resulting suspension enters the base of a reactor comprising a jacketed column 27, which is fitted with a continuous helically-bladed agitator 28 throughout its full length. The reactor is heated or cooled when necessary by the circulation of hot or cold water through the jacket 29. The resulting polymer-containing solution overflows from the reactor 27 through a heat exchanger 30 in which it is cooled prior to removing the clay by filtration in a filter 31 to give a solution of low molecular weight polymer in styrene.

In a typical run with the above-described reactor, the styrene monomer was fed at the rate of 18 liters per hour and the clay catalyst (Fulmont 711C) at 100 grams per hour. The agitator was run at 1,000 r.p.m. and the liquid leaving the reactor had a temperature of 100–110° C. The percentage low molecular weight polystyrene in the product averaged 60%. The product was therefore diluted with styrene monomer to bring the concentration of low molecular weight polystyrene therein to about 20% by weight prior to being passed to a pearl polymerization process in which polystyrene of good molding characteristics was produced in accordance with the present invention.

The general, molding characteristics of polystyrene produced in accordance with the present invention are conveniently assessed by determining a molding area diagram for moldings made on an injection molding machine using a suitable test mold under specified conditions. The test mold selected should be typical of the kind of mold used in the art. In addition, the type of mold used should be sufficiently critical to show differences not only in flow characteristics but also differences in setting up and mold release characteristics. The molding conditions used in the tests referred to in the following examples were: molding cylinder temperatures between 200 and 260° C., line pressures between 600 and 1000 pounds per square inch (p.s.i.), mold temperatures 40° C. and a standard 60 second cycle which included 15 seconds injection and 25 seconds curing. Molding was carried out at various temperatures and pressures to determine the range of temperatures and pressures under which the mold would be satisfactorily filled. The mold used was "pin-gated box mold." In the diagrams of FIGURES III, IV and V of the accompanying drawings this range is denoted by the general area (A) lying above and to the right of the lower curve, and the enclosed area (B) lying within the general area (A) representing the conditions under which perfect moldings are obtained. It will be apparent that the larger area (B) is, the less sensitive is the polystyrene to variations in molding conditions. In general, the area (C) lying below and to the left of the lower curve represents temperatures and pressures giving rise to incomplete moldings, and the small area (D) lying above the short upper curve represents conditions under which over-filling of the mold can occur, with consequent sticking of the molding in the mold.

If desired, liquid lubricants such as mineral oils or butyl stearate can be added to the monomer solution of low molecular weight polystyrene prior to the bulk, emulsion or suspension polymerization so as to incorporate these conventional lubricant additives in the final product. Also if desired the final polymer product can be blended in known manner with other additives such as pigments and fillers as are commonly used in the preparation of molding compositions from polystyrene.

The preparation of polystyrene in accordance with the present invention may be further illustrated by the following examples which will be described with references to FIGURES I, II, IV and V of the accompanying drawings.

EXAMPLE I (Composition I): An 8% solution of low molecular weight polystyrene in styrene monomer prepared by the continuous clay catalyzed process described above was polymerized by the conventional aqueous suspension technique (pearl polymerization described above). The resulting polymer was extruded and chopped up into regular granules for testing in the manner outlined above. Its softening point as determined by the method described in British Standard Specification No. 1493 was 92° C.

(Composition II): By way of comparison a conventional internally lubricated polystyrene also having a softening point of 92° C. made by polymerizing styrene monomer containing 2% of white oil and ½% of butyl stearate by the same aqueous suspension technique was similarly tested.

It will be seen from FIGURE III that the polystyrene in accordance with the present invention (Composition I) has the larger area (B) of perfect molding and also better flow properties in the mold as evidenced by the somewhat smaller area (C), than the corresponding characteristics of the conventional polystyrene (Composition II).

EXAMPLE II (Composition III): 0.1% by weight of stearic acid was added to a 15% solution of low molecular weight polystyrene in styrene monomer prepared by a clay catalyzed process as described above and the resulting solution was polymerized by a conventional aqueous suspension technique as in Example I. The resulting polystyrene in accordance with the invention had a softening point of 86.5° C.

(Composition IV): A 10% solution of low molecular weight polystyrene in styrene monomer and containing also 0.1% of stearic acid and 1½% of butyl stearate was polymerized by the conventional suspension technique to give a polystyrene having a softening point of 80° C.

(Composition V): By way of comparison a conventional polystyrene having a softening point of 79.3° C. was made by polymerizing styrene monomer containing 0.1% stearic acid and 5% butyl stearate by the same conventional suspension technique.

Figure 4:
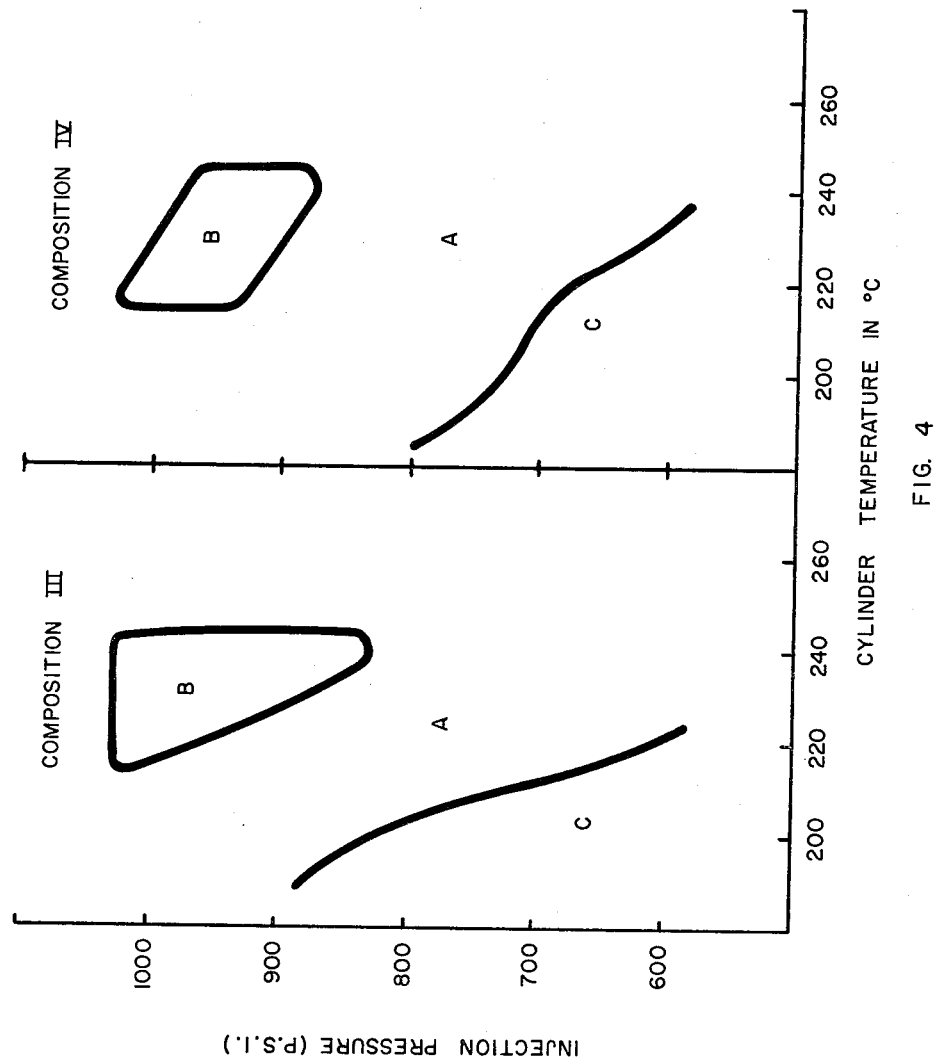
Figure 5:
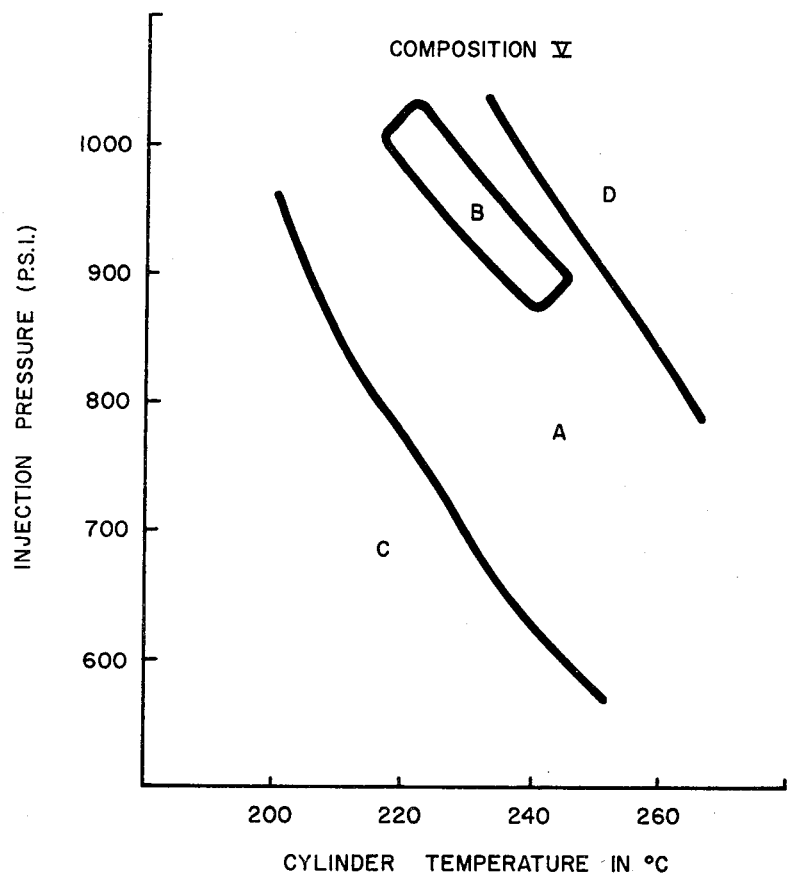

FIGURES 4 and 5 show that the polystyrene (Composition III) and (Composition IV) which are prepared in accordance with the present invention have larger areas (B) of perfect molding and also better flow properties than the conventional polystyrene (Composition V) shown in FIGURE V.

Fractionation of polystyrene in accordance with the present invention confirms that the molecular weight distribution does not follow the normal form but rather that a graph of molecular weight plotted (as abscissa) against relative amount present (ordinate) shows two maxima corresponding to the low and high molecular weight material present.

Compositions containing both styrene and alpha methyl styrene give similarly improved results when polymerized in accordance with the present invention. However, it is generally necessary to use high temperatures in the preparation of the low molecular weight as alpha methyl styrene is incorporated therein. It is also possible to use low molecular weight polystyrene in the low molecular weight, and a different monomer such as a mixture of any styrene and alpha methyl styrene copolymer for the high molecular weight fraction. Such a product is conveniently obtained by providing the solution of low molecular weight polystyrene and styrene as mentioned above in a concentration such that there is an excess of low molecular weight polymer, and adding alpha methyl styrene or both styrene and alpha methyl styrene to the solution thus obtained. The new solution is then polymerized by a conventional free radical polymerization process to convert substantially all of the remaining monomer to a high molecular weight polymer.

We claim as our invention:

1. A process for preparing a polyvinyl-aromatic substance containing from about 75 to about 95% of a high molecular weight polymer and from about 5 to about 25% of a low molecular weight polymer, which comprises mixing a monomeric vinyl-aromatic compound of the group consisting of styrene, alpha-methyl styrene and mixtures thereof with a catalyst capable of catalyzing a cationic polymerization, continuously feeding the mixture to an elongated reaction zone in the form of a closed circuit, rapidly circulating the mixture in said zone while maintaining the temperature of the mixture between about 50° C. and 110° C. for a time sufficient to polymerize from about 5 to about 50% of the monomer to a molecular weight of from 1500 to 5000, withdrawing polymerized reaction mixture from said zone, cooling the withdrawn mixture to below about 30° C., separating catalyst from the cooled mixture, adding sufficient monomeric vinyl-aromatic compound of the group consisting of styrene, alpha-methyl styrene and mixtures thereof to said low molecular weight polyvinyl aromatic compound to provide a solution having relatively proportions of from 5 to 25 parts low molecular weight polymer and from 75 to 95 parts monomer, and subjecting the solution to a free radical polymerization for a time and temperature sufficient to polymerize substantially all of the monomer to a molecular weight above 60,000.

2. The process defined in claim 1, in which the temperature of the reaction mixture is maintained at from 60° C. to 80° C., and the catalyst is an activated earth which is added to the monomer in an amount of from 0.5 to 1.5% of the monomer.

3. A process for preparing a polyvinyl-aromatic substance containing from about 75 to about 95% of a high molecular weight polymer and from about 5 to about 25% of a low molecular weight polymer, which comprises mixing a monomeric vinyl-aromatic compound of the group consisting of styrene, alpha-methyl styrene and mixtures thereof with a catalyst capable of catalyzing a cationic polymerization, continuously feeding the mixture to an elongated reaction zone in the form of a closed circuit, rapidly circulating the mixture in said zone while maintaining the temperature of the mixture between about 50° C. and 110° C., withdrawing mixture from the reaction zone which has polymerized in an amount sufficient to leave from 75 to 95% unpolymerized monomer and from 5 to 25% polymer having an average molecular weight of from 1500 to 5000, cooling the withdrawn mixture to a temperature below 30° C., separating catalyst from the cooled mixture, and subjecting the mixture to a free radical polymerization for a time and temperature sufficient to polymerize substantially all of the monomer to a molecular weight above 60,000.

4. The process defined in claim 3, in which the temperature of the reaction mixture is maintained at from 60° C. to 80° C., and the catalyst is an activated earth which is added to the monomer in an amount of from 0.5 to 1.5% of the monomer.

5. A process for preparing a polystyrene containing from about 75 to 95% of a high molecular weight polymer and from about 5 to about 25% of a low molecular weight polymer, which comprises mixing styrene with a catalyst capable of catalyzing a cationic polymerization, continuously feeding the mixture to an elongated reaction zone in the form of a closed circuit, rapidly circulating the mixture in said zone while maintaining the temperature of the mixture between about 50° C. and 110° C. for a time sufficient to polymerize from about 5 to about 50% of the monomer to a molecular weight of from 1500 to 5000, withdrawing partially polymerized reaction mixture which has from about 5 to 50% of the styrene polymerized, cooling the withdrawn mixture to below about 30° C., separating catalyst from the cooled mixture to leave a solution of styrene and polystyrene adding a sufficient amount of styrene to adjust the proportions of polystyrene and styrene to from about 5 to 25% polystyrene and 75 to 95% styrene, and subjecting the solution to a free radical polymerization for a time and temperature sufficient to polymerize substantially all of the monomer to a molecular weight above 60,000.

6. The process defined in claim 5, in which the temperature of the reaction mixture is maintained at from 60 to 80° C., and the catalyst is an activated earth.

7. A process for preparing a polystyrene containing from about 75 to 95% of a high molecular weight polymer and from about 5 to about 25% of a low molecular weight polymer, which comprises mixing styrene with a catalyst capable of catalyzing a cationic polymerization, continuously feeding the mixture to an elongated reaction zone in the form of a closed circuit, rapidly circulating the mixture in said zone while maintaining the temperature of the mixture between about 50 and 110° C., withdrawing mixture from the reaction zone which has polymerized in an amount sufficient to contain from 75 to 95% unpolymerized monomer and from 5 to 25% polymer having an average molecular weight of from 1500 to 5000, cooling with withdrawn mixture to a temperature below 30° C., separating catalyst from the cooled mixture, and subjecting the mixture to a free radical polymerization such that the remaining styrene is polymerized, to a molecular weight above 60,000.

8. A process for preparing a polyvinyl-aromatic substance containing from about 75 to about 95% of a high molecular weight polymer and from about 5 to about 25% of a low molecular weight polymer, which comprises mixing a monomeric vinyl-aromatic compound of the group consisting of styrene, alpha-methyl styrene and mixtures thereof with a catalyst capable of catalyzing a cationic polymerization, rapidly circulating the mixture while maintaining the temperature of the mixture between about 50° C., and 110° C. for a time sufficient to polymerize from about 5 to about 50% of the monomer to a molecular weight of from 1500 to 5000, withdrawing polymerized reaction mixture from said zone, cooling the withdrawn mixture to below about 30° C., separating catalyst from the cooled mixture, adding sufficient monomeric vinyl-aromatic compound of the group consisting of styrene, alpha-methyl styrene and mixtures thereof to said low molecular weight polyvinyl aromatic compound to provide a solution having relatively proportions of from 5 to 25 parts low molecular weight polymer and from 75 to 95 parts monomer, and subjecting the solution to a free radical polymerization for a time and temperature sufficient to polymerize substatnially all of the monomer to a colecular weight above 60,000.

References Cited in the file of this patent

UNITED STATES PATENTS

| | | |
|---|---|---|
| 2,145,501 | Waterman et al. | Jan. 31, 1939 |
| 2,317,857 | Soday | Apr. 27, 1943 |
| 2,359,196 | Britton et al. | Sept. 26, 1944 |
| 2,864,802 | Price et al. | Dec. 16, 1958 |